United States Patent
Ojha et al.

(10) Patent No.: US 12,381,891 B2
(45) Date of Patent: Aug. 5, 2025

(54) ARTIFICIAL INTELLIGENCE-BASED DYNAMIC, ADAPTIVE, AND PREDICTIVE INFORMATION SECURITY THREAT IDENTIFICATION

(71) Applicants: Akarsh Ojha, San Jose, CA (US); Anurag Ojha, San Jose, CA (US)

(72) Inventors: Akarsh Ojha, San Jose, CA (US); Anurag Ojha, San Jose, CA (US)

( * ) Notice: Subject to any disclaimer, the term of this patent is extended or adjusted under 35 U.S.C. 154(b) by 258 days.

(21) Appl. No.: 18/046,308

(22) Filed: Oct. 13, 2022

(65) Prior Publication Data

US 2023/0123625 A1    Apr. 20, 2023

Related U.S. Application Data

(60) Provisional application No. 63/262,534, filed on Oct. 14, 2021.

(51) Int. Cl.
*H04L 9/40* (2022.01)

(52) U.S. Cl.
CPC .......... *H04L 63/1416* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2015/0127809 A1* | 5/2015 | Akella | H04L 47/125 709/224 |
| 2016/0314109 A1* | 10/2016 | Singh | G06F 40/131 |

* cited by examiner

*Primary Examiner* — Brian Whipple
(74) *Attorney, Agent, or Firm* — Dunlap Bennett & Ludwig, PLLC; Anna L. Kinney

(57) ABSTRACT

A system includes a compute engine that implements artificial intelligence-based dynamic, predictive, statistical classification meta-algorithms for better information security threat identification. The closed loop output of this algorithm uses a dynamic weights model along with AI/ML/DL to identify diverse information security threats more comprehensively and more efficiently. This system evolves with time and self-corrects to adapt to the ever changing needs of cyber security.

2 Claims, 7 Drawing Sheets

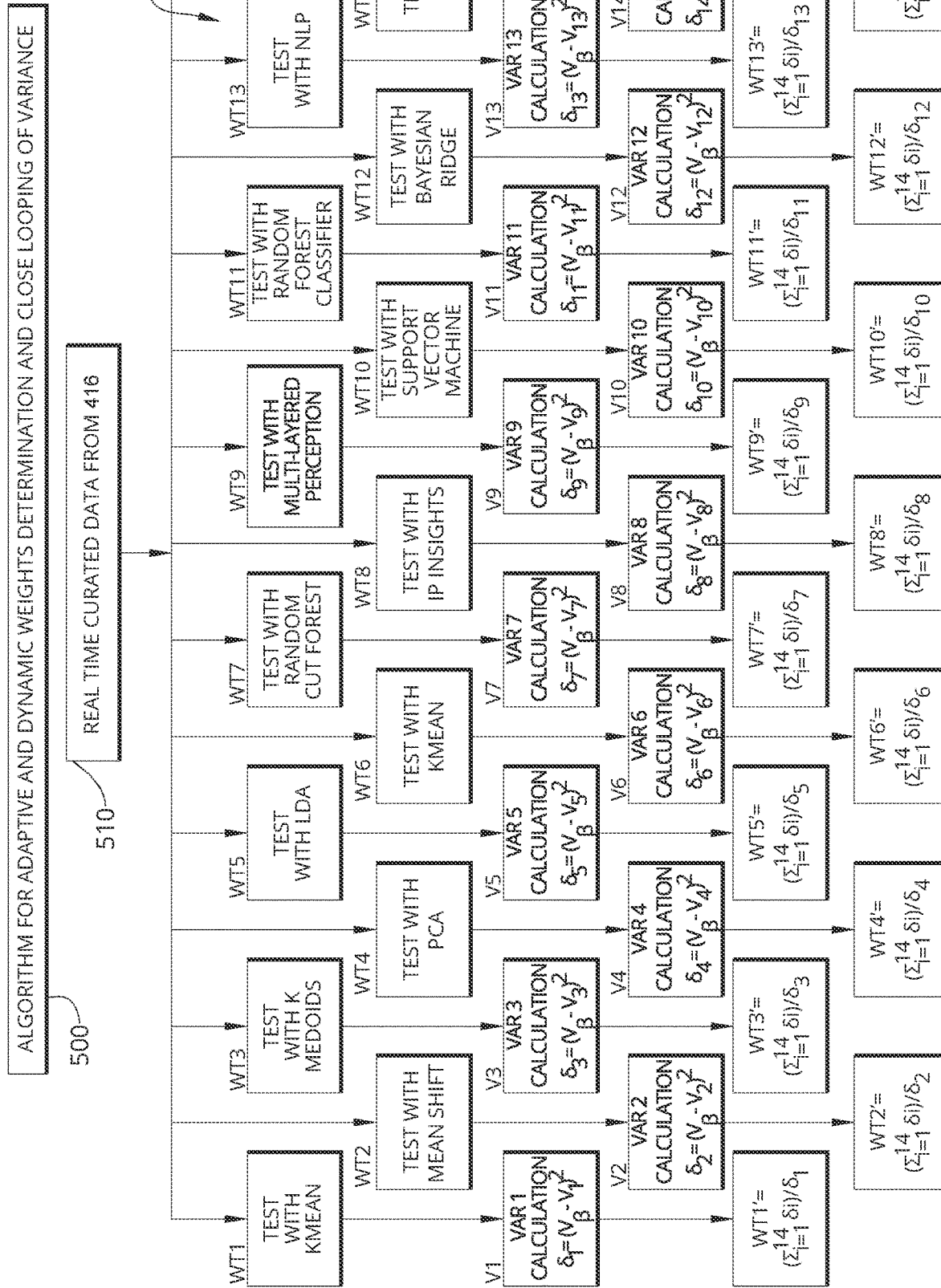

ARTIFICIAL INTELLIGENCE-BASED DYNAMIC, ADAPTIVE, AND PREDICTIVE INFORMATION SECURITY THREAT IDENTIFICATION

CROSS-REFERENCE TO RELATED APPLICATION

This application claims the benefit of priority of U.S. provisional application No. 63/262,534, filed Oct. 14, 2021, the contents of which are herein incorporated by reference.

BACKGROUND OF THE INVENTION

The present invention relates to information security threat identification and, more particularly, to artificial intelligence-based dynamic, adaptive, and predictive statistical classification meta-algorithms therefor.

Information Security is a prominent customer and business need and in the current business operating environment there is no business that can overlook the need of strong and effective Information Security. On average, the cost of an Information Security attack can run into millions of dollars of revenue, diluted brand image, big penalties, increased costs, efforts to strengthen the organization's security posture, a longer sales cycle, and reduced productivity. Currently, an organization's information security posture is based on known virus/ransomware/malware signatures. This is a suboptimal solution and is not able to solve the more complex security attacks. Cyber criminals are now using artificial intelligence and machine learning to create more sophisticated attack vectors. We cannot wait for an attack to happen and then act. We need to have predictive algorithms that use artificial intelligence/machine learning/deep learning to have better information security identification, protection, detection, response, and recoverability. Current artificial intelligence (AI)/machine intelligence (ML) based security solutions are less effective as they do not use predictive AI/ML based weighted factors and do not dynamically change the weights to include the latest information on attack vectors; hence, they are very simplistic.

Current intrusion detection solutions (IDS) do not solve the problem effectively as they are non-predictive, not adaptive, and non-dynamic, they do not use intrusion attack algorithm variance vectors and weights as a closed loop system to change the algorithm based on changing scenarios and traffic. They do not use multiple algorithms together to arrive at desired weights for each algorithm.

As can be seen, there is a need for better algorithms that use the comprehensive capability of AI/ML/deep learning (DL).

SUMMARY OF THE INVENTION

In one aspect of the present invention, a system comprises a computer processor configured to implement artificial intelligence-based dynamic, predictive, statistical classification meta-algorithms for an information security threat identification process by: recording and managing real time traffic on a server in a network, the recording and managing of individual client actions executing at all layers of a security protocol stack of the network.

In another aspect of the present invention, a computer readable medium comprises instructions that when executed by a processor execute by determining a variance associated with an algorithm by comparing with known issue test data; and calculating a square of the variance.

In another aspect of the present invention, a process of implementing artificial intelligence-based dynamic, predictive, statistical classification meta-algorithms comprises recalculating weights and reducing a variance if a resultant variance is not within a risk threshold.

These and other features, aspects and advantages of the present invention will become better understood with reference to the following drawings, description, and claims.

BRIEF DESCRIPTION OF THE DRAWINGS

FIG. 5 is a schematic diagram illustrating an algorithm and features of a process that implements artificial intelligence-based dynamic, predictive, statistical classification meta-algorithms for better information security threat identification;

DETAILED DESCRIPTION OF THE INVENTION

Figure 1:
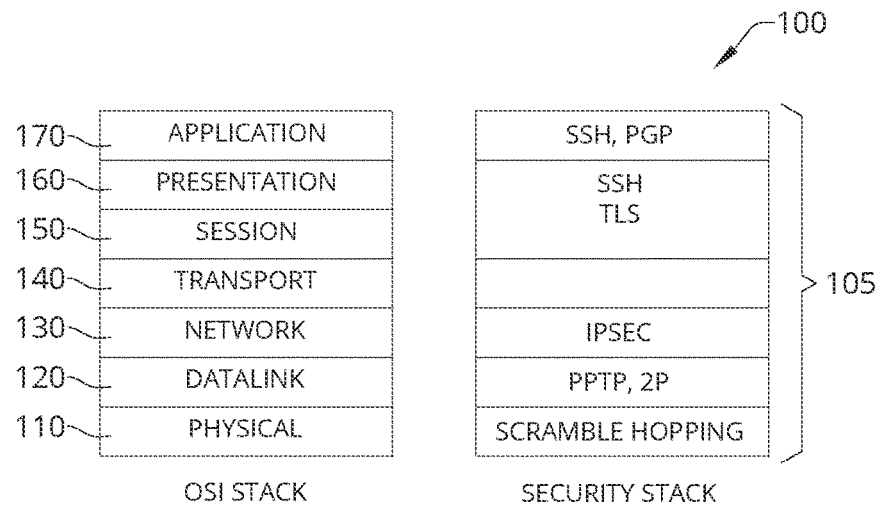
FIG. 1 is a schematic diagram illustrating an information security protocol stack.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a method of producing artificial intelligence-based dynamic, predictive, statistical classification meta-algorithms for better information security threat identification and a system therefor.

The present invention provides an algorithm that creates a closed loop system that uses a dynamic weights model along with AI/ML/DL to identify diverse information security threats more comprehensively and more efficiently. This model evolves with time and self-corrects to adapt to the ever-changing needs of cyber security. The functionality targets the following wide range of technology solutions across many businesses:

Better predictive model and algorithm for comprehensive information security Threat Identification;

Dynamic algorithms with capability to self-correct based on variance and adapt to newer scenarios and better security signatures/algorithms;

Better Precision/reduced false positive Security recommendations;
Fine grained Security modeling;
Better Performance of overall solution; and
Fine grained Debugging.

Typically, intrusion detection solutions work by having security protocols at a network stack.

A better IDS functionality may be implemented by a system that uses artificial intelligence/machine learning/deep learning to have better Information Security threat Identification. The inventive security threat identification is more effective and efficient as it uses predictive AI/ML-based weighted factors, reduces the variance, dynamically changes the weights to include the latest information attack vectors and correlates them to produce a multiple weighed algorithm that has higher efficiency and better performance in diverse attack scenarios and uses the comprehensive capability of AI/ML/DL.

Some embodiments of the invention are described herein in the general context of computer-executable instructions, such as program modules, being executed by a computer, such as a personal computer. Generally, program modules include routines, programs, objects, components, data structures, etc., that perform tasks or implement abstract data types.

The accompanying drawings show by way of illustration, and not of limitation, specific embodiments in which the subject matter may be practiced.

Referring to FIGS. 1-3, 4A, 4B, and 5-7, FIG. 1 illustrates a prior art network protocol stack 100 including a physical layer 110, a datalink layer 120, a network layer 130, a transport layer 140, a session layer 150, a presentation layer 160, and an application layer 170. As indicated at 105, security protocols solutions currently known in the art execute at the physical layer 110, the datalink layer 120, the network layer 130, the transport layer 140, and/or the session layer 150 and a presentation layer 160.

Figure 2:
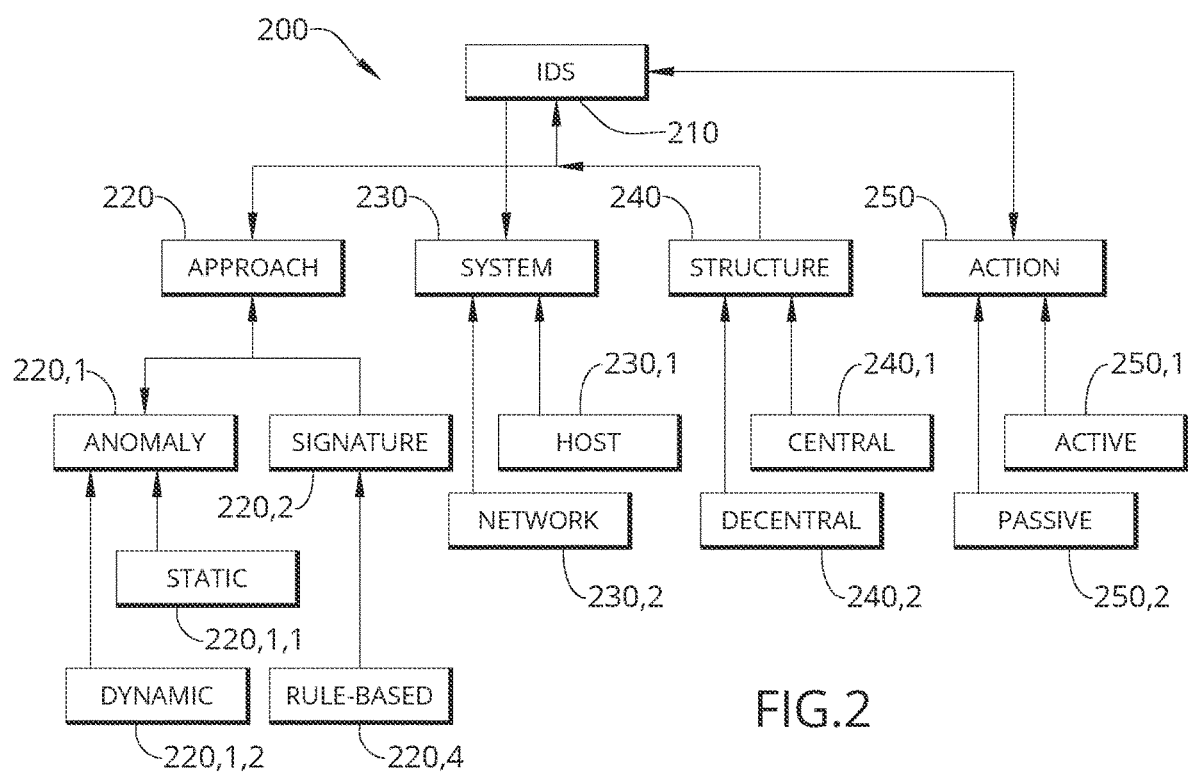
FIG. 2 is a block diagram illustrating prior art intrusion threat detection.

The system 200 of FIG. 2 builds on the system of FIG. 1, including executing at all layers, e.g., a physical layer 110, a datalink layer 120, a network layer 130, a transport layer 140, a session layer 150, a presentation layer 160, and an application layer 170. As illustrated at 200 in FIG. 2, the system 200 of FIG. 2 implements the security intrusion detection. The system 200 of FIG. 2 shows various components of current intrusion detection blocks, mainly approach-based IDS 220, including Anomaly-based IDS 220,1 and Signature-based IDS 220,2; System-based IDS 230; Structure-based IDS 240; and Action-based IDS 250. Anomaly-based IDS 220,1 includes static anomaly IDS 220,1,1 and dynamic anomaly IDS 220,1,2. Signature-based IDS 220,2 includes Rule-based IDS 220,4. System-based IDS includes Host IDS 230,1 and network-based IDS 230,2. Structure-based IDS includes Central IDS 240,1 and Decentral IDS 240,2. Action-based IDS 250 includes active actions IDS 250,1 and passive action IDS 250,2.

Figure 3:
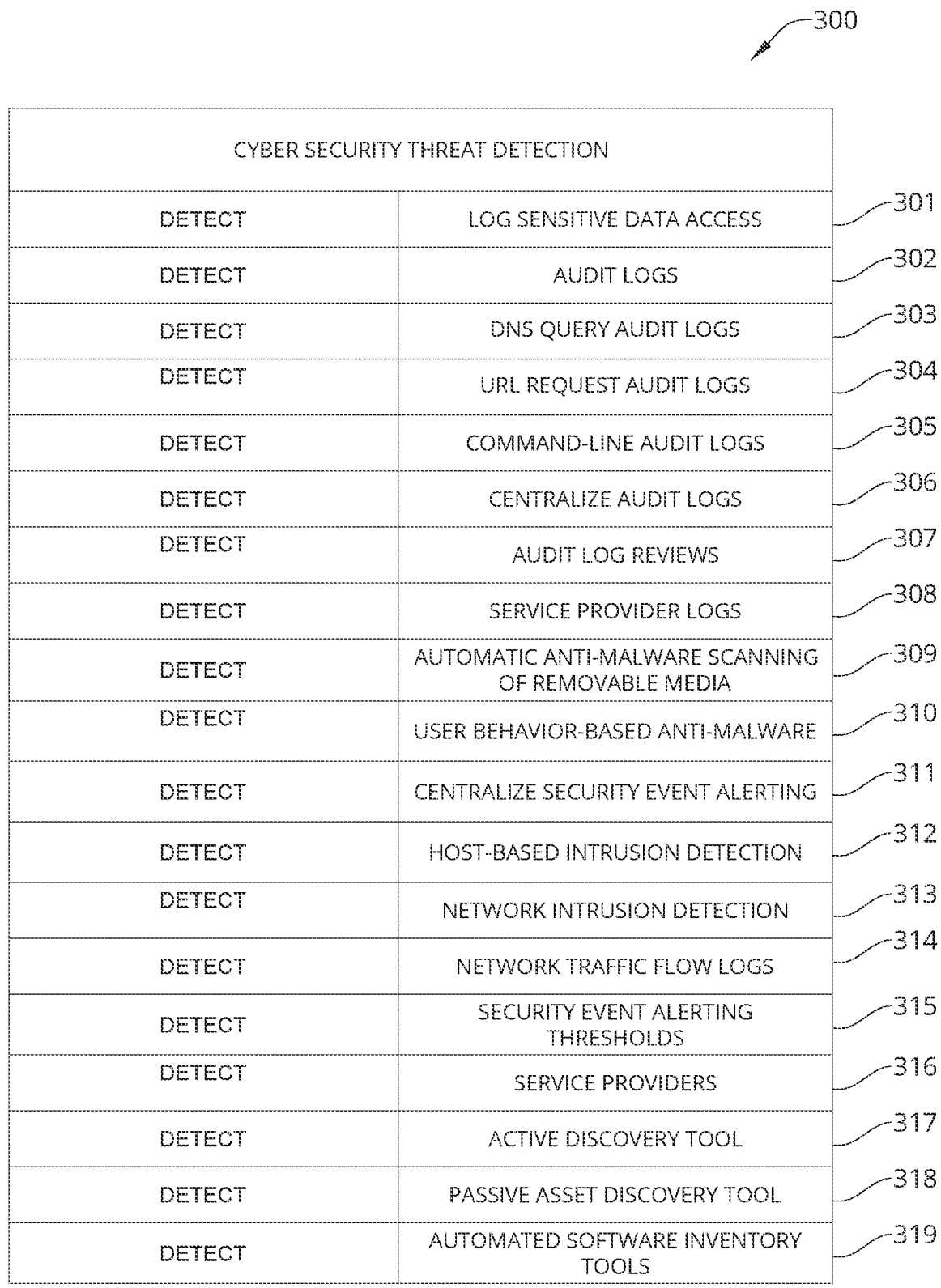
FIG. 3 is a schematic diagram of a threat detection system operative to detect various anomaly-based threat detection vectors.

FIG. 3 illustrates in further detail a system 300 that implements cybersecurity threat detection. The system 300 includes a Log Sensitive Data Access layer 301, Audit Logs layer 302, domain name system (DNS) Query Audit Logs layer 303, uniform resource locator (URL) Request Audit Logs layer 304, Command-Line Audit Logs layer 305, Centralize Audit Logs 306, Audit Log Reviews layer 307, Service Provider Logs layer 308, Automatic Anti-Malware Scanning of Removable Media layer 309, User Behavior-Based Anti-Malware layer 310, Centralize Security Event Alerting layer 311, Host-Based Intrusion Detection layer 312, Network Intrusion Detection layer 313, Network Traffic Flow Logs layer 314, Security Event Alerting Thresholds layer 315, Service Providers layer 316, Active Discovery Tool layer 317, Passive Asset Discovery Tool layer 318, and Automated Software Inventory Tools layer 319. Each of the system 300 layers implement cybersecurity threat detection.

An approach implemented as described by the current disclosure, also referred to herein as artificial intelligence-based dynamic, predictive, statistical classification meta-algorithms for better information security threat identification, is illustrated in FIG. 4A, FIG. 4B, FIG. 5, and FIG. 6.

Figure 4A:
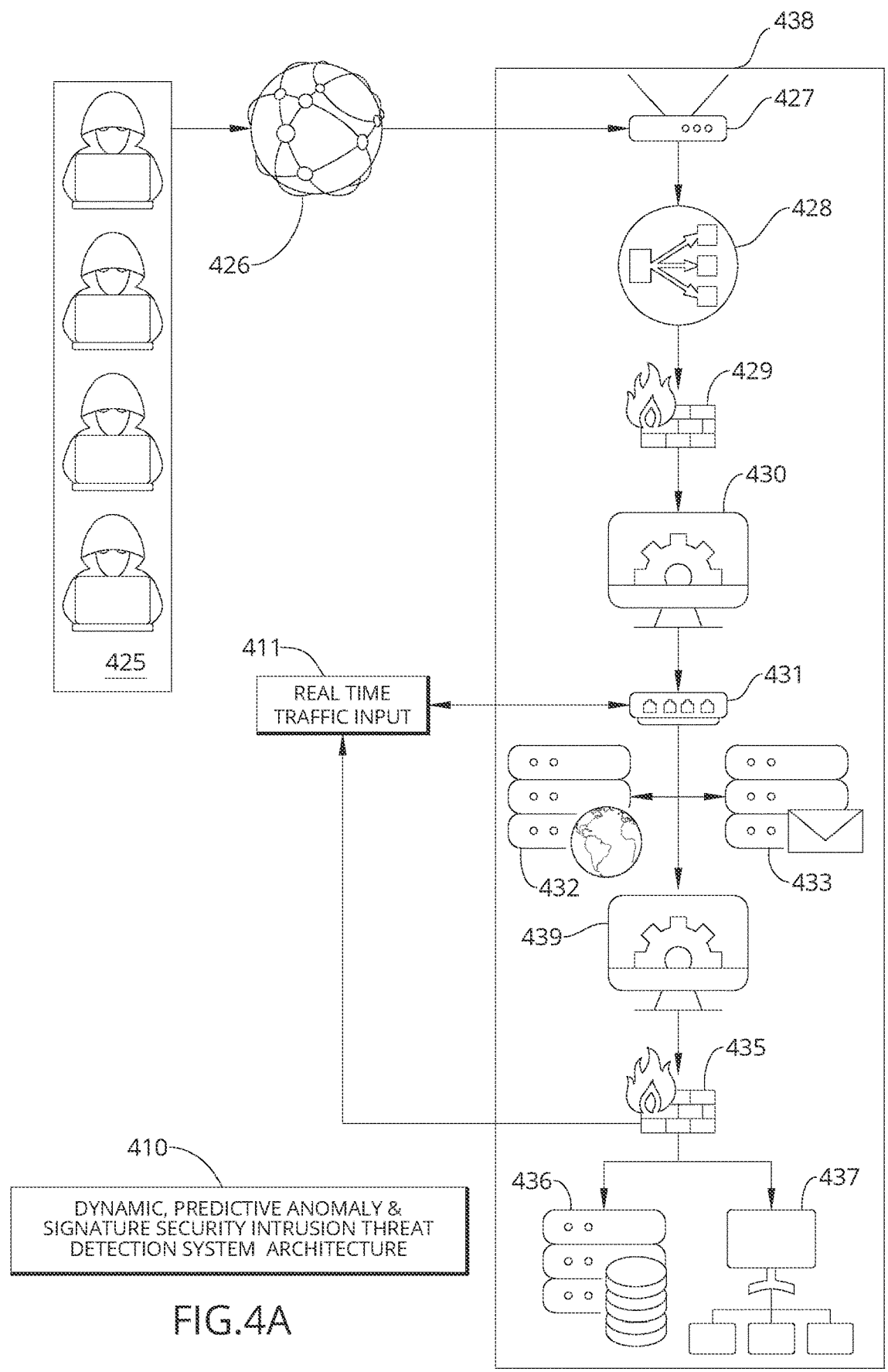
FIG. 4A is a schematic diagram showing a system that implements an algorithm according to an embodiment of the present invention.
Figure 4B:
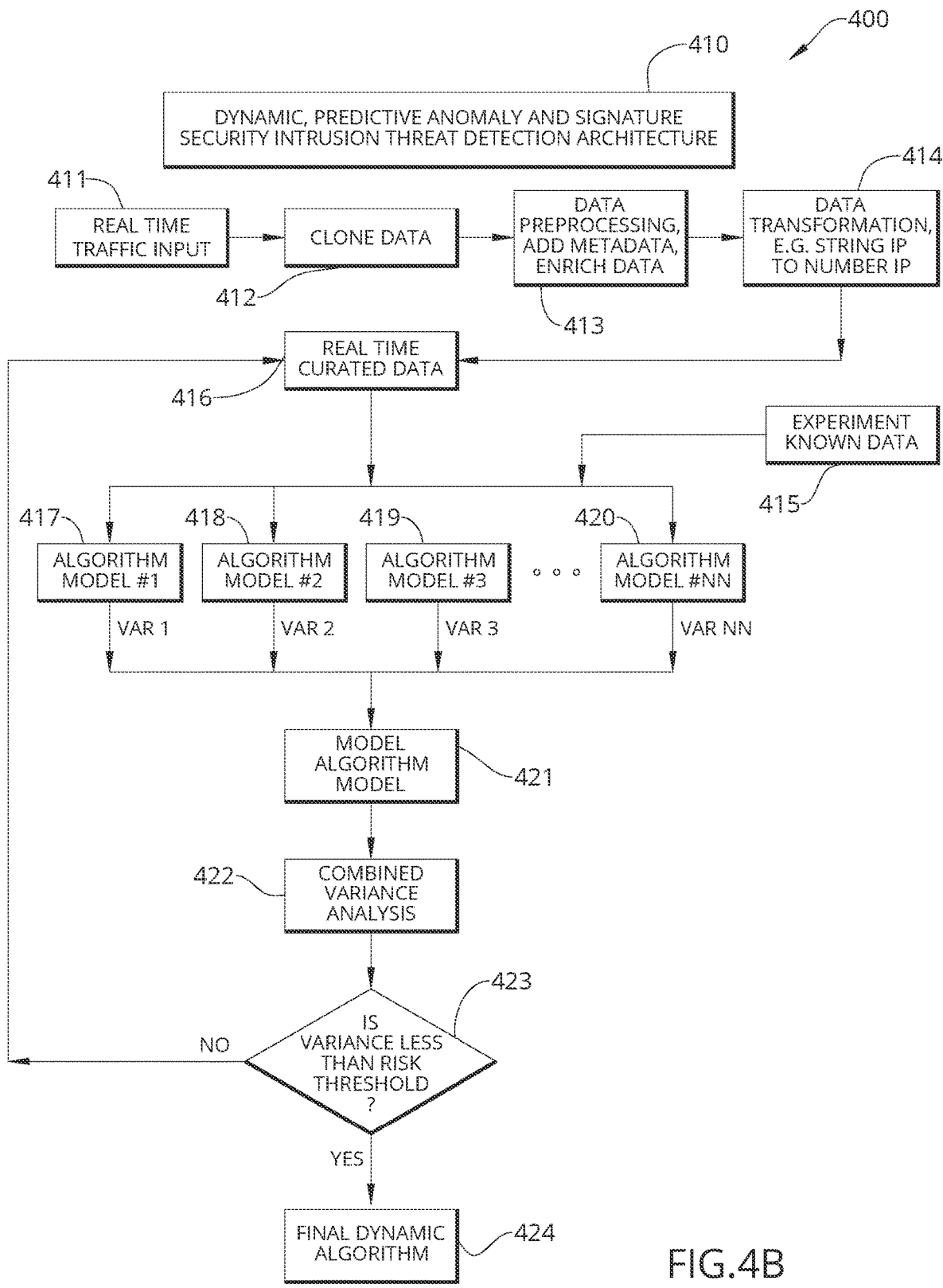
FIG. 4B is a block diagram illustrating a method of algorithm development according to an embodiment of the present invention.

FIGS. 4A and 4B illustrate a system 400 for creating a dynamic, predictive anomaly & signature security intrusion threat detection system architecture 410 for artificial intelligence-based dynamic, predictive, statistical classification meta-algorithms for better information security threat identification. The system 400 provides data ingestion, data curation, data translation, data transformation, and data enrichment, including Real time traffic input 411 that is ingested in the system, Clone data module 412, Data Pre-processing and adding metadata, enrich data module 413, Data Transformation module 414 (e.g., string IP to number IP), known data module 415, Real time curated data module 416 and various algorithm modules 417-420. Model Algorithm model 421 assigns weights to the various algorithms to come up with a proposed algorithm, which is analyzed by the Variance Analysis module 422 and is checked by the variance threshold check module 423, and the Final dynamic algorithm module 424 produces a final algorithm which is dynamic, has reduced statistical variance, and is more effective as compared to prior art methods.

As shown in FIG. 4A, the bad actors/attackers 425 create the attack vectors-based traffic which they send via internet 426 to a company 438 that they want to attack. The attack traffic goes through router 427, elastic load balancer 428, and lands at firewall 429. A system appliance 430 executes an algorithm 500 (see FIG. 5) according to an embodiment of the present invention and provides real time traffic 411. The curated traffic post-algorithm 500 goes to Switch 431 which distributes the traffic to a demilitarized zone (DMZ) area where webserver 432 and mail server 433 are hosted. The traffic then goes to system appliances 439 where algorithm 500 is executed again and provides real time traffic 411. The curated traffic post-algorithm 500 goes to firewall 435 and then goes to database (DB) server 436 and local area network (LAN) traffic 437.

FIG. 5 illustrates an algorithm 500 and features thereof that implements artificial intelligence-based dynamic, predictive, statistical classification meta-algorithms for better information security threat identification. FIG. 5 includes a number of process blocks 510-540. Though arranged serially in the FIG. 5 example, in some embodiments, the process modules represented by the blocks may be reordered, one or more blocks may be omitted, and/or two or more blocks may be executed in parallel using multiple processors or using a single processor organized as two or more virtual machines or sub-processors. Moreover, still other embodiments may implement the blocks as one or more specific interconnected hardware or integrated circuit modules with related control and data signals communicated between and through the modules. Thus, any process flow is applicable to software, firmware, hardware, and hybrid implementations.

Referring to FIG. 5, Real time curated data 416 input 510 includes detailed information about traffic, URL query command-line interface (CLI) audit, switched virtual circuit (SVC) provider logs, malware scanning results, user behavior analytics host-based IDS, Network-based IDS, security events thresholds, client connections, client responses to different types of server requests via different types of servers, compliance reporting, software management, and patch management. A weight process 520 applies a weight to each algorithm, e.g., wt1 is applied to kmean.

The variance process 530 calculates the variance by comparing output of the algorithm subject to the weight process 520 with known test data 415 according to the formula $\delta_1 = (V_\beta - V_1)^2$. A calculation engine process 540 calculates new weights to be applied as part of a closed loop system to get better predictive security threat identification. A status snapshot is recorded and managed on a per client basis at the application layer of the network protocol stack of the network. The recorded data may include databases that a client has read from and/or written to, and times and durations that a client has been connected to and in communication with a particular server, i.e., real time traffic. The snapshot of the calculation engine process 540 includes recommended changes in weights associated with each algorithm.

Referring again to FIG. 4B, the new weights are applied to the model algorithm model 421, variance analysis 422 is performed, and weight process 520, variance process 530 calculation, and new weight calculation process 540 steps of FIG. 5 are repeated until the combined variance analysis 422 is within a predetermined acceptable variance threshold 423 set by an organization, i.e., the recalculated variance is compared to a set threshold. This process results in a final weighted algorithm that has individual weights assigned or applied to various algorithms that are customized for each organization.

When new data is input 510, the existing recommended weights are recalculated, and the final recommended combination is again evaluated. This process ensures that the recommended algorithm set is not static and keeps evolving as newer threats and better identification signature/algorithms become available.

Figure 6:
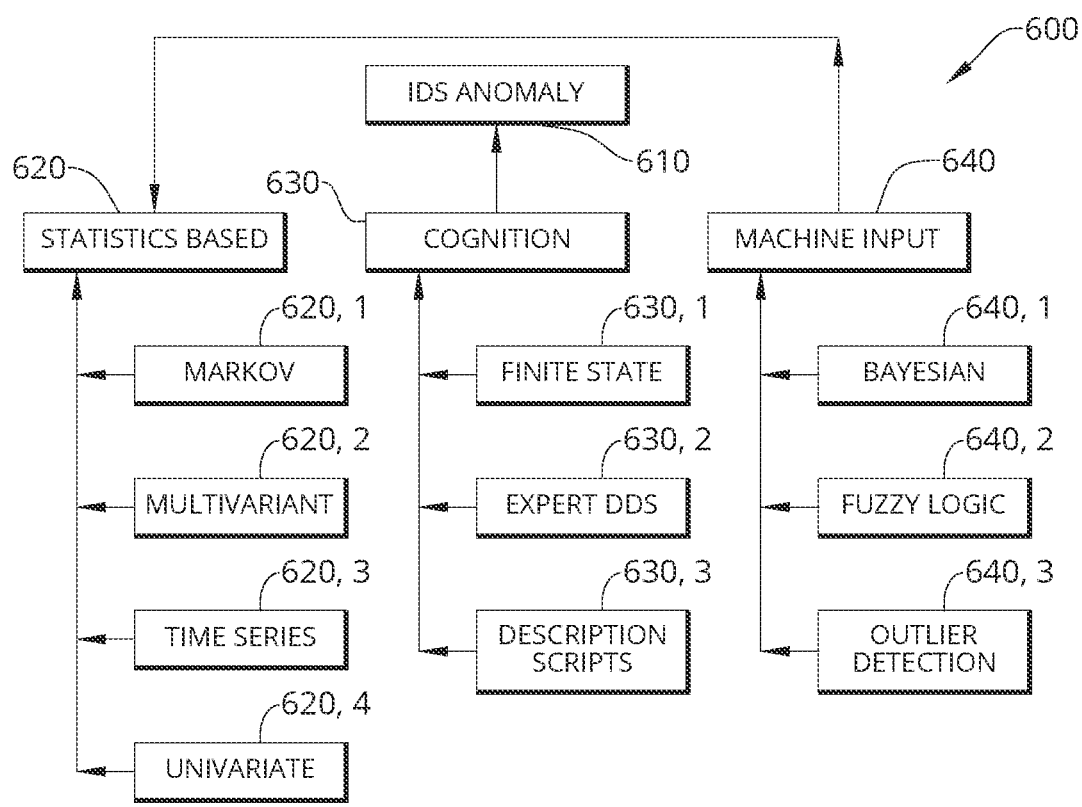
FIG. 6 is a schematic diagram of various Anomaly-based IDS algorithms that produce test data with known threats.

FIG. 6 is an overview of various Anomaly-based IDS algorithms 610 that are used to create test data with known threats for testing models and algorithms according to embodiments of the present invention, such as those illustrated in FIG. 4B and FIG. 5. Statistics-based algorithms 620 may include Markov 620,1, multivariant 620,2, time series 620,3, and univariate 620,4. Cognition algorithms 630 may include finite state 630,1, expert decision support system (DSS) 630,2, and description scripts 630,3. Machine input algorithms 640 may include Bayesian 640,1, FuzzyLogic 640,2, and outlier detection 640,3.

Figure 7:
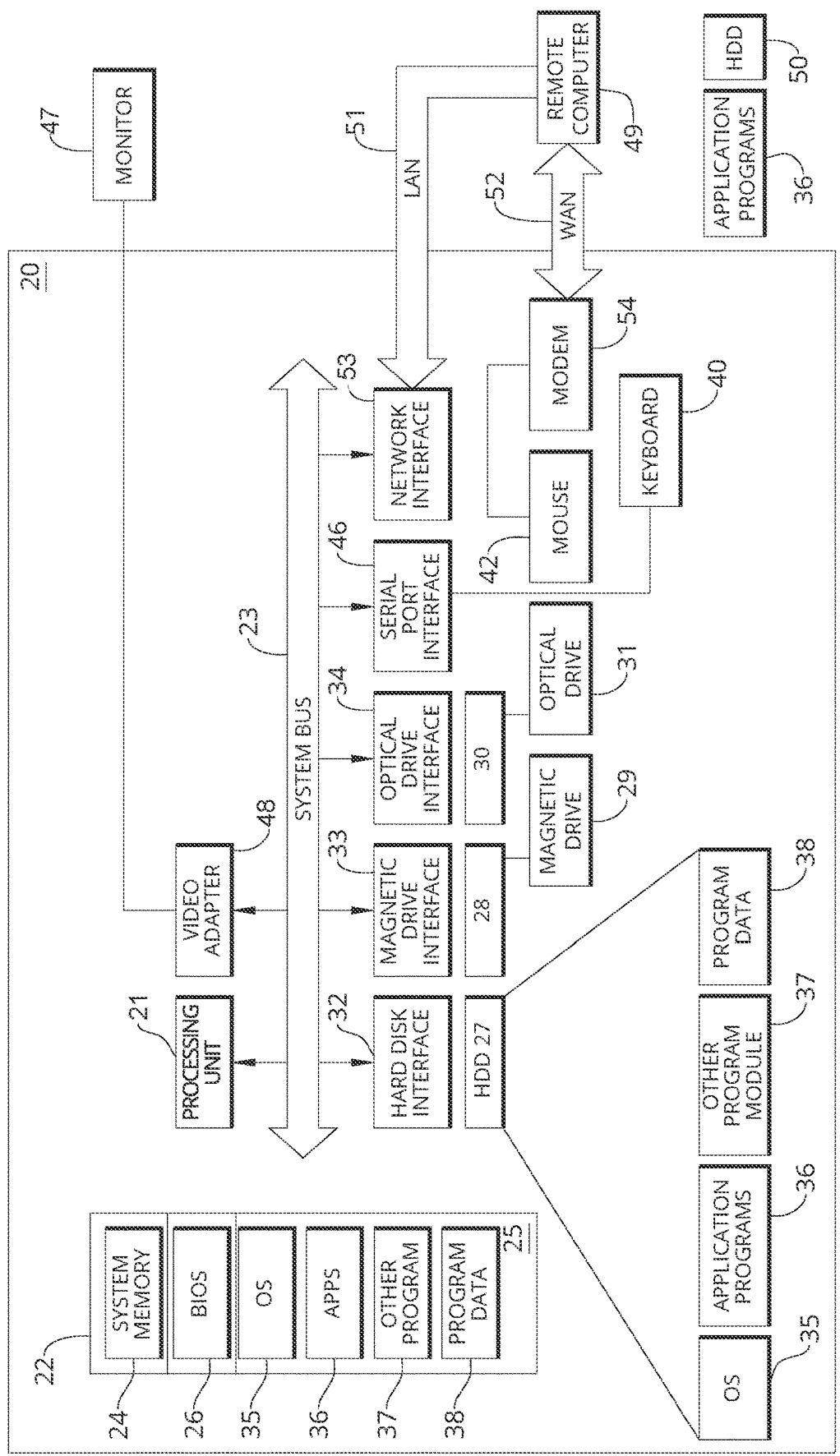
FIG. 7 is schematic diagram of a system for implementing artificial intelligence-based dynamic, predictive, statistical classification meta-algorithms according to an embodiment of the present invention, comprising hardware and an operating environment.

As shown in FIG. 7, one embodiment of the hardware and operating environment, in conjunction with which embodiments of the invention may be practiced, includes a general-purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system may include cloud computing environments. In various embodiments, computer 20 is a conventional computer, a distributed computer, or any other type of computer. The system shown in FIG. 7 is applicable to any server and/or remote client shown in the other Figures.

The system bus 23 may be any of several types of bus structures including a memory bus or memory controller, a peripheral bus, and a local bus using any of a variety of bus architectures. The system memory may also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 31 for reading from or writing to a removable optical disk (not shown) such as a CD ROM or other optical media.

The hard disk drive 27, magnetic disk drive 28, and optical disk drive 31 (via an interface bus 30) couple with a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules may be stored on the hard disk 27, magnetic disk 29, optical disk (not shown), ROM 24, or RAM 25, including an operating system 35, one or more application programs 36, other program modules 37, and program data 38. A plug in containing a security transmission engine for the present invention may be resident on any one or number of these computer-readable media.

A user may enter commands and information into computer 20 through input devices such as a keyboard 40 and a pointing device 42, e.g., a mouse. Other input devices (not shown) may include a microphone, joystick, game pad, satellite dish, scanner, or the like. These other input devices are often connected to the processing unit 21 through a serial port interface 46 that is coupled to the system bus 23, but may be connected by other interfaces, such as a parallel port, game port, or a universal serial bus (USB). A monitor 47 or other type of display device may also be connected to the system bus 23 via an interface, such as a video adapter 48. The monitor 47 may display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 may be another computer, a server, a router, a network PC, a client, a peer device, or other common network node, and typically includes many or all the elements described above relative to the computer 20, although only a memory storage device 50 has been illustrated. The logical connections depicted in FIG. 7 include a LAN 51 and/or a wide area network (WAN) 52. Such networking environments are commonplace in office networks, enterprise-wide computer networks, intranets, and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 may be stored in the remote memory storage medium or device 50 of remote computer or server 49. It is appreciated that the network connections shown are exemplary and other means of, and communications devices for, establishing a communications link between the computers may be used including hybrid fiber-coax connections, T1-T3 lines, digital subscriber lines (DSL), optical carrier (OC)-3 and/or OC-12, Transmission Control Protocol/Internet Protocol (TCP/IP), microwave, wireless application protocol, and any other electronic media through any suitable switches, routers, outlets, and power lines, as the same are known and understood by one of ordinary skill in the art.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by input (I)/output (O) remote processing devices that are linked through a communications network. In a distributed computing environment, program modules may be in both local and remote memory storage devices, i.e., computer storage mediums.

It should be understood, of course, that the foregoing relates to exemplary embodiments of the invention and that modifications may be made without departing from the spirit and scope of the invention as set forth in the following claims.

What is claimed is:

1. A process of implementing artificial intelligence-based dynamic, predictive, statistical classification meta-algorithms, comprising:
    recording and managing real-time network traffic on a server in a network, the recording and managing including storing individual client actions executed at all layers of a security protocol stack;
    applying a weight process to dynamically assign weights to a plurality of threat detection algorithms;
    calculating a variance associated with each of the plurality of threat detection algorithms by comparing its output with known issue test data;
    recalculating the weights in a closed-loop system when the calculated variance does not fall within a predetermined risk threshold; and
    synchronizing data from multiple server sites in asynchronous and synchronous modes.

2. The process of claim 1, further comprising applying each of the plurality of threat detection algorithms for which the calculated variance falls within the predetermined risk threshold.

* * * * *